(12) United States Patent
Lee et al.

(10) Patent No.: US 11,519,467 B1
(45) Date of Patent: Dec. 6, 2022

(54) ELECTRIC DRIVE WITH DISCONNECT

(71) Applicant: Schaeffler Technologies AG & Co. KG, Herzogenaurach (DE)

(72) Inventors: Brian Lee, Charlotte, SC (US); Jordan Geiser, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/506,855

(22) Filed: Oct. 21, 2021

(51) Int. Cl.
*F16D 41/064* (2006.01)
*F16D 27/11* (2006.01)

(52) U.S. Cl.
CPC ............ *F16D 41/064* (2013.01); *F16D 27/11* (2013.01); *F16D 2041/0646* (2013.01)

(58) Field of Classification Search
CPC .......................... F16D 27/11; F16D 2041/0646
See application file for complete search history.

(56) References Cited

U.S. PATENT DOCUMENTS

| | | | |
|---|---|---|---|
| 6,409,001 B1 | 6/2002 | Kerr | |
| 6,557,680 B2 | 5/2003 | Williams | |
| 7,415,905 B2 | 8/2008 | Maguire et al. | |
| 7,980,217 B2 * | 7/2011 | Evans | F01L 1/053 123/90.6 |
| 2004/0110593 A1 | 6/2004 | Szaloney et al. | |
| 2008/0006499 A1 * | 1/2008 | Joki | F16D 27/01 192/41 A |
| 2008/0128233 A1 * | 6/2008 | Joki | F16D 41/086 192/45.1 |
| 2018/0291968 A1 * | 10/2018 | Sarnie | F16D 15/00 |

* cited by examiner

*Primary Examiner* — Timothy Hannon

(57) ABSTRACT

An electric drive for a vehicle implements a disconnect feature to reduce parasitic losses when the electric drive is not necessary for propulsion. The disconnect feature utilizes a slipper clutch which is disengaged by holding a slipper ring in a predefined circumferential position relative to an outer ring using a set of pins that move radially. A lever spring biases the pins to the outward radial position. A solenoid moves a plunger axially which pushes the pins radially inward.

14 Claims, 4 Drawing Sheets

ELECTRIC DRIVE WITH DISCONNECT

TECHNICAL FIELD

The disclosure concerns an electric drive for a vehicle. More particularly, the disclosure concerns an electric drive having a disconnect feature utilizing a slipper clutch and an actuator with radial pins.

BACKGROUND

Slipper clutches are known from, for example, U.S. Pat. No. 6,409,001. A slipper clutch includes an inner ring and an outer ring and a set of rollers radially between the inner ring and the outer ring. An inner surface of the outer ring and an outer surface of the inner ring have complementary ramped surfaces. Relative circumferential displacement between the inner ring and the outer ring causes the rollers to roll up the ramps and exert radial forces tending to separate the rings. One of the two rings, known as a slipper ring, has an axial slit which allows it to change diameter in response to the radial forces. If the slipper ring is the inner ring, it contracts in response to the radial forces to grab a shaft, coupling the outer ring to the shaft. If the slipper ring is an outer ring, it expands in response to the radial forces to grab a cylinder, coupling the inner ring to the cylinder. When the inner ring and the outer ring are held at a pre-determined circumferential position relative to one another, the slipper ring slips with respect to the shaft or cylinder with minimal drag.

SUMMARY

A disconnect unit including first and second shafts, a slipper clutch, at least one pin, a plunger, and a lever spring. The slipper clutch has an outer ring, an inner ring, and a plurality of rollers. The outer ring is radially adjacent to a concave surface of the first shaft and may be fixed to the first shaft. The inner ring, which may have an axial slot, is radially adjacent to a convex surface of the second shaft. The rollers are radially between the inner ring and the outer ring and are configured to radially separate the inner and outer rings to rotationally couple the first shaft to the second shaft in response to a rotational displacement of the inner ring with respect to the outer ring. The at least one pin is supported to move radially between a disengaged position and an engaged position. In the disengaged position, it fixes a rotational position of the inner ring with respect to the outer ring. In the engaged position, it permits relative rotation between the inner ring and the outer ring. The plunger is supported to move axially between a first position and a second position. In the first position, the lever spring biases the at least one pin toward the engaged position. In the second position, the lever spring is compressed and the at least one pin is held in the disengaged position. A solenoid may be configured to force the plunger from the first position to the second position. The lever spring may include a ring fixed to one of the first and second shafts and at least one lever arm linking the ring to the at least one pin.

An electric drive has an electric motor, a gearbox, an output shaft, a slipper clutch, at least one pin, a plunger, and a lever spring. The electric motor has a stator and a rotor. The gearbox has an input fixed to the rotor and a gearbox output. The slipper clutch has an outer ring, an inner ring, and a set of rollers. The outer ring is radially adjacent to a concave surface of the gearbox output and may be fixed to the gearbox output. The inner ring radially adjacent to a convex surface of the output shaft and may have an axial slot. The rollers are radially between the inner ring and the outer ring and are configured to radially separate the inner and outer rings to rotationally couple the gearbox output to the output shaft in response to a rotational displacement of the inner ring with respect to the outer ring. The at least one pin is supported to move radially between a disengaged position and an engaged position. In the disengaged position, it fixes a rotational position of the inner ring with respect to the outer ring. In the engaged position, it permits relative rotation between the inner ring and the outer ring. The plunger is supported to move axially between a first position and a second position. In the first position, the lever spring biases the at least one pin toward the engaged position. In the second position, the lever spring is compressed and the at least one pin is held in the disengaged position. A solenoid may be configured to force the plunger from the first position to the second position. The lever spring may include a ring fixed to the gearbox output and at least one lever arm linking the ring to the at least one pin. The electric drive may also include first and second housings which are bolted together. The gearbox output is supported with respect to the first housing by a first bearing. The output shaft is supported with respect to the second housing by a second bearing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
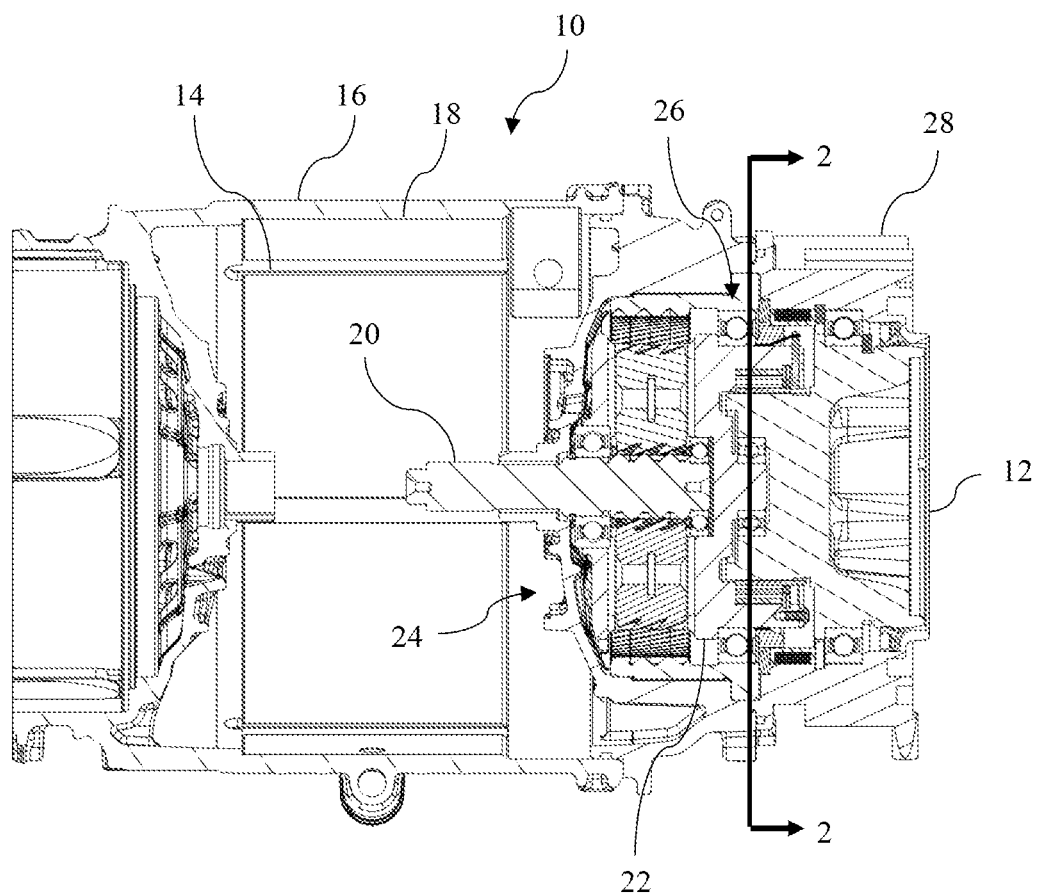
FIG. 1 is a side cross section of an electric drive with a disconnect clutch.

FIG. 1 illustrates an electric drive with a disconnect 10. In a connected mode, an electric motor drives an output shaft 12. The speed of the rotor 14 of the electric motor is proportional to the speed of the output shaft 12. Power flows between the electric motor and the output shaft (primarily, but not exclusively, from the electric motor to the output shaft). Even when the motor is not called upon to provide or receive power, the rotor still rotates which results in significant parasitic drag. In a disconnected mode, the speeds of the rotor and the output shaft are not directly related. Typically, the rotor is stationary. Only a small amount of parasitic drag is exerted on the output shaft.

The electric motor includes the rotor 14 which is supported for rotation with respect to a housing 16 and a stator 18 which is fixed to the housing. Rotor 14 is fixed to a gearbox input shaft 20. Power flows from gearbox input shaft 20 to gearbox output shaft 22 via planetary gearbox 24. Output shaft 12 is selectively coupled to gearbox output shaft 22 by disconnect clutch 26. A separate housing 28 supports the output shaft 12 and the disconnect clutch 26.

Figure 2:
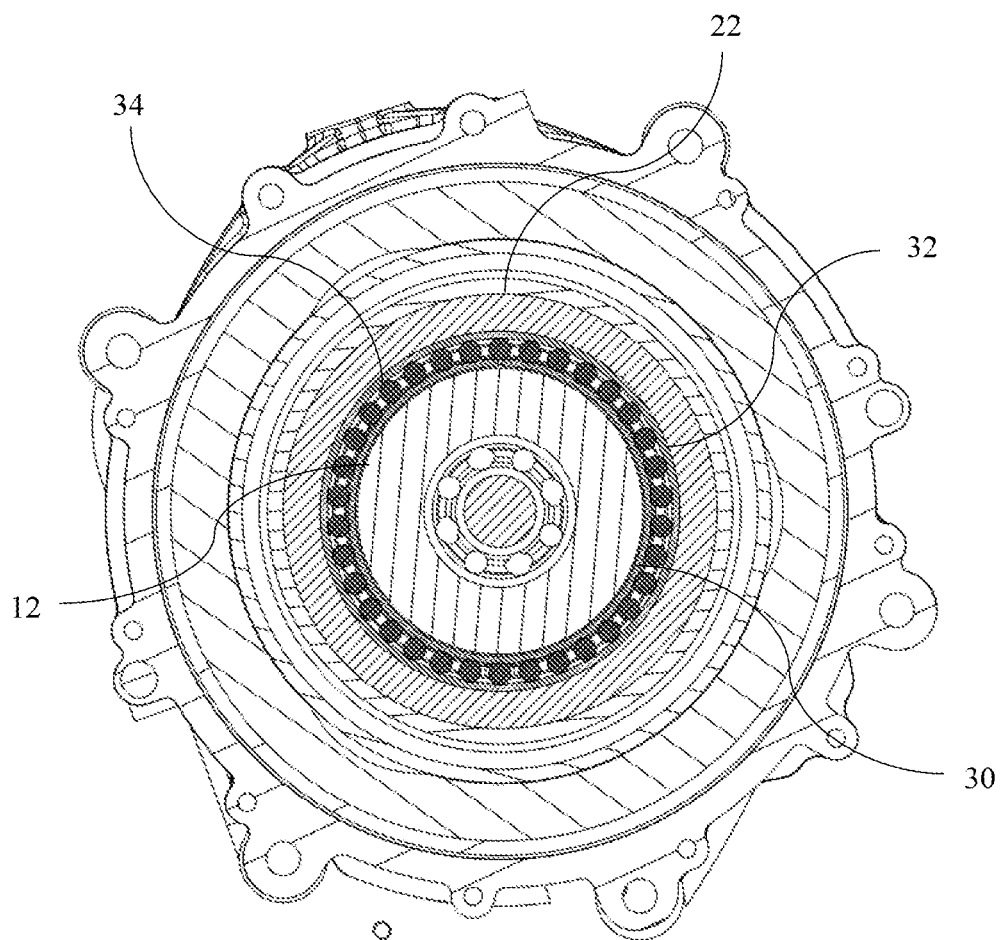
FIG. 2 is an end cross section of the electric drive of FIG. 1.
Figure 3:
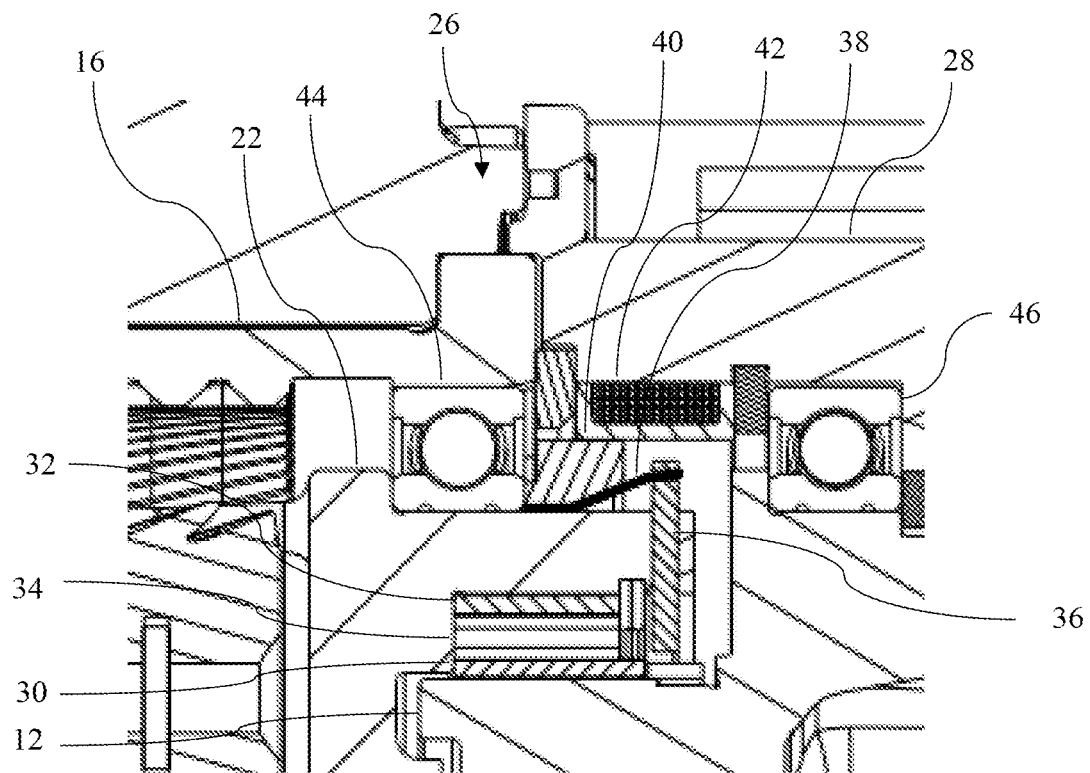
FIG. 3 is a detail cross section view of the disconnect clutch and actuator of the electric drive of FIG. 1 in the engaged condition.
Figure 4:
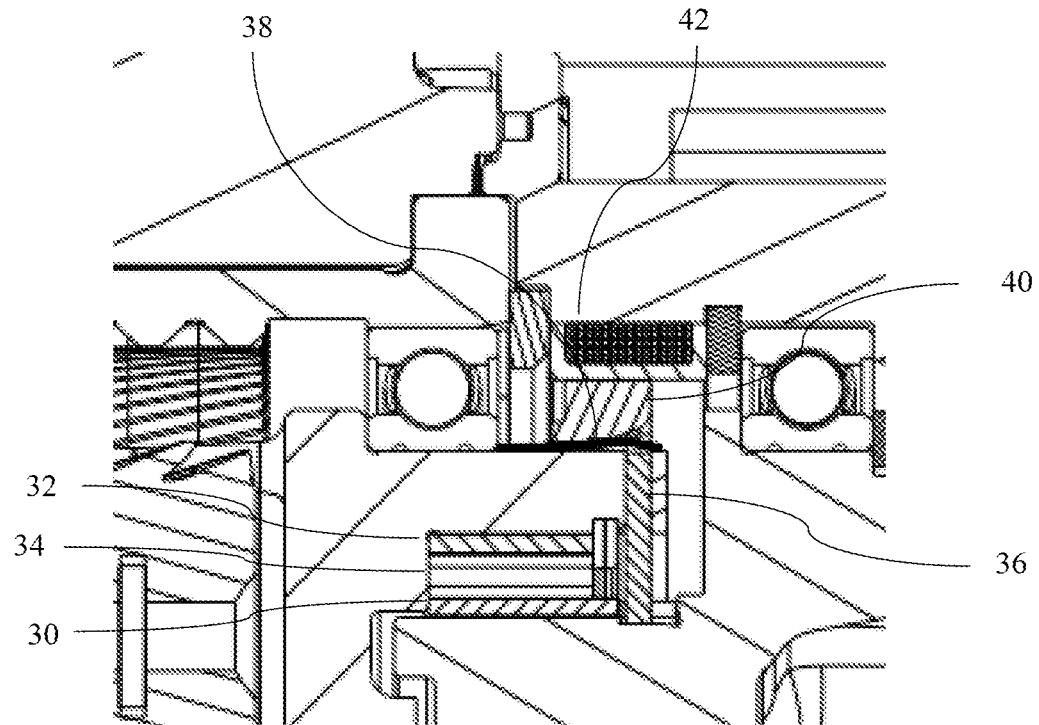
FIG. 4 is a detail cross section view of the disconnect clutch and actuator of the electric drive of FIG. 1 in the disengaged condition.

FIGS. 2-4 show parts of the slipper clutch 26 in more detail. Slipper ring (inner ring) 30 radially surrounds the output shaft 12. Outer ring 32 is fixed to gearbox output shaft 22. A set of rollers 34 is located radially between the slipper ring 30 and the outer ring 32. The inner surface of outer ring 32 and the outer surface of slipper ring 30 have circumferential ramps in alternating directions. When the slipper ring 30 and the outer ring 32 are circumferentially aligned, the ramps line up in a way that the rollers fit loosely. Relative rotation causes the rollers to be squeezed between ramps such that they exert an inward radial forces of the slipper ring.

FIG. 3 illustrates the slipper clutch 26 and actuator in the engaged condition. A set of pins 36 are located at various circumferential positions with respect to gearbox output shaft 22 and move radially. In the engaged position, as shown in FIG. 3, lever spring 38 pulls the pins radially outward away from the slipper ring 30. Outward movement of lever spring also pushes on a beveled surface of solenoid plunger 40 pushing it towards the left. With the pin 36 disengaged from the slipper ring 30, slight drag torque between slipper ring 30 and output shaft 12 cause the slipper ring to rotate slightly with respect to the outer ring 32. The slight rotation results in radial forces which increase the drag torque between slipper ring 30 and output shaft 12. This re-enforcing cycle causes slipper ring 30 to grip output shaft 12 tightly such that the two components are coupled. The ramps limit relative rotation between slipper ring 30 and outer ring 32 such that output shaft is also coupled to outer ring 32 and gearbox output shaft 22. Therefore, power is transmitted from the electric motor to the output shaft 12.

FIG. 4 illustrates the slipper clutch 26 and actuator in the disengaged condition. This condition is achieved by energizing solenoid 42. The solenoid exerts an axial force on solenoid plunger 40, pulling solenoid plunger to the right. The beveled surface of the solenoid plunger compresses the lever spring 38, which pushes the pins 36 radially inward.

The pins 36 engage with a slot in the slipper ring 30 holding the slipper ring in the aligned position. With the slipper ring held in the aligned circumferential position relative to the outer ring, the rollers 34 are positioned off the ramps and do not exert radial forces. Slipper ring 30 is free to rotate with respect to output shaft 12 with only a small degree of parasitic drag. In the disengaged position, the rotor can be stopped while the output shaft 12 rotates with the wheels, thereby eliminating a substantial source of parasitic drag.

Referring again to FIG. 3, notice that gearbox output shaft 22 is supported with respect to housing 16 by bearing 44. Output shaft 12 is supported with respect to housing 28 by bearing 46. This permits a modular assembly in which a version of the electric axle without the disconnect feature utilizes many common parts with the version illustrated. In the alternative version, housing 28 is omitted along with the clutch and actuation components. A slightly revised output shaft is then fixed to the gearbox output shaft.

Figure 5:
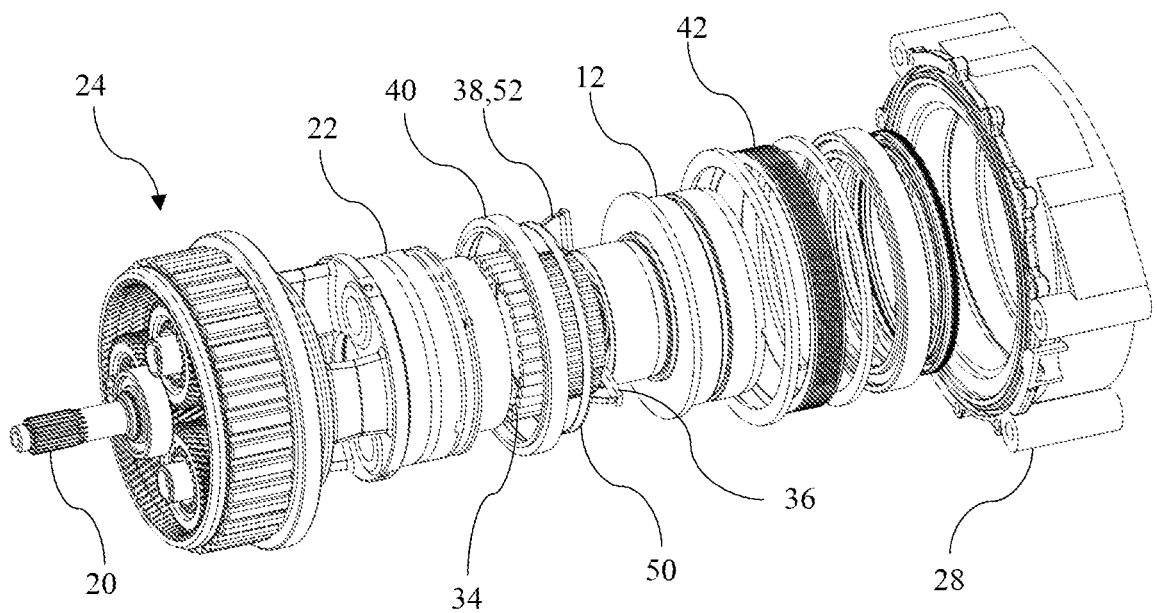
FIG. 5 is a first exploded view of the electric drive of FIG. 1.
Figure 6:
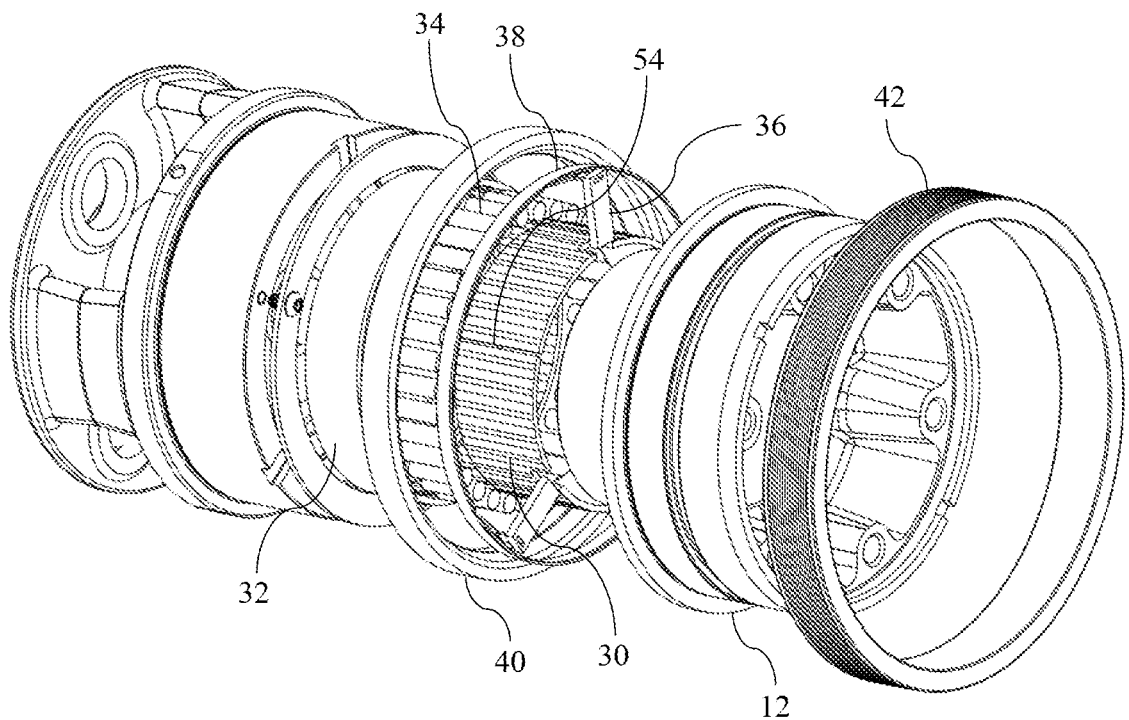
FIG. 6 is a second exploded view of the electric drive of FIG. 1.

FIGS. 5 and 6 are exploded views of the electric drive from two different perspectives. This view illustrates the three-dimensional shapes of some of the components that may not be apparent from the two dimensional views. In particular, the lever spring 38 includes a ring 50 that stays in place relative to gearbox output shaft 22 and a plurality of lever arms 52 that link the ring 50 to the radial pins 36.

As shown in FIG. 5, gearbox output shaft 22 is a carrier of planetary gearbox 24 and that gearbox input shaft 20 is coupled to a sun gear of the planetary gearbox 24.

As shown in FIG. 6, note that inner ring 30 includes an axial slot 54. This slot permits the inner ring to change in diameter in response to the radial forces applied by the rollers 34 to clamp onto the output shaft 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A disconnect unit comprising:
   a first shaft supported for rotation about an axis;
   a second shaft supported for rotation about the axis;
   a slipper clutch having an outer ring radially adjacent to a concave surface of the first shaft, an inner ring radially adjacent to a convex surface of the second shaft, and a plurality of rollers radially between the inner ring and the outer ring and configured to radially separate the inner and outer rings to rotationally couple the first shaft to the second shaft in response to a rotational displacement of the inner ring with respect to the outer ring;

at least one pin supported to move radially between a disengaged position in which it fixes a rotational position of the inner ring with respect to the outer ring and an engaged position in which it permits relative rotation between the inner ring and the outer ring; and a plunger supported to move axially from a first position in which a lever spring biases the at least one pin toward the engaged position and a second position in which the lever spring is compressed and the at least one pin is held in the disengaged position.

2. The disconnect unit of claim 1 further comprising a solenoid configured to force the plunger from the first position to the second position.

3. The disconnect unit of claim 1 wherein the lever spring comprises:
a ring fixed to one of the first and second shafts; and
at least one lever arm linking the ring to the at least one pin.

4. The disconnect unit of claim 1 wherein the outer ring is fixed to the first shaft and the inner ring has an axial slot.

5. An electric drive comprising:
an electric motor having a stator and a rotor;
a gearbox having an input fixed to the rotor and having a gearbox output;
an output shaft;
a slipper clutch having an outer ring radially adjacent to a concave surface of the gearbox output, an inner ring radially adjacent to a convex surface of the output shaft, and a plurality of rollers radially between the inner ring and the outer ring and configured to radially separate the inner and outer rings to rotationally couple the gearbox output to the output shaft in response to a rotational displacement of the inner ring with respect to the outer ring;
at least one pin supported to move radially between a disengaged position in which it fixes a rotational position of the inner ring with respect to the outer ring and an engaged position in which it permits relative rotation between the inner ring and the outer ring; and
a plunger supported to move axially from a first position in which a lever spring biases the at least one pin toward the engaged position and a second position in which the lever spring is compressed and the at least one pin is held in the disengaged position.

6. The electric drive of claim 5 further comprising a solenoid configured to force the plunger from the first position to the second position.

7. The electric drive of claim 5 wherein the lever spring comprises:
a ring fixed to the gearbox output; and
at least one lever arm linking the ring to the at least one pin.

8. The electric drive of claim 5 wherein the outer ring is fixed to the gearbox output and the inner ring has an axial slot.

9. The electric drive of claim 5 further comprising:
a first housing supporting the stator wherein the gearbox output is supported with respect to the first housing by a first bearing; and
a second housing bolted to the first housing, wherein the output shaft is supported with respect to the second housing by a second bearing.

10. An electric drive comprising:
an electric motor having a stator and a rotor:
a gearbox having an input fixed to the rotor and having a gearbox output;
an output shaft;
a slipper clutch having an outer ring fixed to the gearbox output, an inner ring radially adjacent to a convex surface of the output shaft, and a plurality of rollers radially between the inner ring and the outer ring and configured to radially separate the inner and outer rings to rotationally couple the gearbox output to the output shaft in response to a rotational displacement of the inner ring with respect to the outer ring;
at least one pin supported to move radially between a disengaged position in which it fixes a rotational position of the inner ring with respect to the outer ring and an engaged position in which it permits relative rotation between the inner ring and the outer ring; and
a plunger supported to move axially from a first position in which a lever spring biases the at least one pin toward the engaged position and a second position in which the lever spring is compressed and the at least one pin is held in the disengaged position.

11. The electric drive of claim 10 further comprising a solenoid configured to force the plunger from the first position to the second position.

12. The electric drive of claim 10 wherein the lever spring comprises:
a ring fixed to the gearbox output; and
at least one lever arm linking the ring to the at least one pin.

13. The electric drive of claim 10 wherein the inner ring has an axial slot.

14. The electric drive of claim 10 further comprising:
a first housing supporting the stator wherein the gearbox output is supported with respect to the first housing by a first bearing; and
a second housing bolted to the first housing, wherein the output shaft is supported with respect to the second housing by a second bearing.

* * * * *